United States Patent
Itou et al.

(10) Patent No.: US 8,733,157 B2
(45) Date of Patent: May 27, 2014

(54) CYLINDER INNER PRESSURE DETECTOR FOR INTERNAL COMBUSTION ENGINE

(75) Inventors: Akito Itou, Kariya (JP); Daisuke Kawakami, Anjo (JP)

(73) Assignee: Denso Corporation, Kariya (JP)

( * ) Notice: Subject to any disclaimer, the term of this patent is extended or adjusted under 35 U.S.C. 154(b) by 170 days.

(21) Appl. No.: 13/490,730

(22) Filed: Jun. 7, 2012

(65) Prior Publication Data

US 2013/0036803 A1 Feb. 14, 2013

(30) Foreign Application Priority Data

Aug. 11, 2011 (JP) ................................. 2011-175911

(51) Int. Cl.
*G01M 15/02* (2006.01)

(52) U.S. Cl.
USPC ...................................................... 73/114.16

(58) Field of Classification Search
USPC .............................. 73/114.16, 114.17, 114.18
See application file for complete search history.

(56) References Cited

U.S. PATENT DOCUMENTS

| | | | |
|---|---|---|---|
| 8,600,644 B2 * | 12/2013 | Verner et al. ................... | 701/102 |
| 2006/0032291 A1 * | 2/2006 | Kashiwase et al. ........... | 73/35.06 |
| 2011/0088459 A1 * | 4/2011 | Tugnolo et al. ............ | 73/114.16 |
| 2012/0303238 A1 * | 11/2012 | Verner et al. ................... | 701/102 |
| 2013/0179052 A1 * | 7/2013 | Kawakami et al. ........... | 701/111 |

FOREIGN PATENT DOCUMENTS

| | | |
|---|---|---|
| JP | 7-280686 | 10/1995 |
| JP | 2002-242750 | 8/2002 |
| JP | 2008-216223 | 9/2008 |
| JP | 2008-297952 | 12/2008 |
| JP | 2009-229328 | 10/2009 |
| JP | 2010-196556 | 9/2010 |

* cited by examiner

Primary Examiner — Eric S McCall
(74) Attorney, Agent, or Firm — Nixon & Vanderhye P.C.

(57) ABSTRACT

An cylinder inner pressure detector of an internal combustion engine includes: a reference voltage output circuit for outputting a reference voltage having a level, which is selected among multiple levels according to a switching signal; a level shift circuit for shifting a level of a sensor signal of an inner pressure sensor by a selected level of the reference voltage toward a signal potential side corresponding to a low pressure side of cylinder inner pressure; a first A/D converter circuit for converting the shifted sensor signal from an analog signal to a digital signal; and a controller for outputting the switching signal, which provides the reference voltage such that the reference voltage has the level on the signal potential side corresponding to the low pressure side from an offset voltage, and for detecting the cylinder inner pressure based on the digital signal output from the first A/D converter.

17 Claims, 5 Drawing Sheets

CYLINDER INNER PRESSURE DETECTOR FOR INTERNAL COMBUSTION ENGINE

CROSS REFERENCE TO RELATED APPLICATION

This application is based on Japanese Patent Application No. 2011-175911 filed on Aug. 11, 2011, the disclosure of which is incorporated herein by reference.

TECHNICAL FIELD

The present disclosure relates to a cylinder inner pressure detector for detecting an inner pressure of a cylinder of an internal combustion engine by converting a sensor signal from a cylinder inner pressure sensor.

BACKGROUND

An internal combustion engine includes a cylinder inner pressure sensor for outputting a signal in accordance with an inner pressure of a combustion chamber of a cylinder of the engine. A body of the cylinder inner pressure sensor is arranged in an insertion hole formed on a cylinder head. The pressure in the combustion chamber is applied to a Piezo electric device via a diaphragm of the sensor. An output voltage of the Piezo electric device is output through an amplifier circuit in the sensor. A sensor signal from the sensor is input into an engine ECU (electronic control unit), and the engine ECU converts the signal to a digital signal so that an A/D conversion process is performed. Then, the engine ECU detects the inner pressure of the cylinder based on the converted signal. Further, the engine ECU detects a firing state of the engine such as an ignition timing and firing temperature based on the inner pressure. Thus, the engine ECU can detect a knocking of the engine and a misfire of the engine.

However, under a condition that the temperature and/or the pressure of the engine are rapidly and largely changed, the output voltage of the cylinder inner pressure sensor drifts due to the variation of the temperature and the pressure. When the voltage of the sensor signal, i.e., the offset voltage, is measured around at a suction stroke, at which the cylinder inner pressure is minimum, the offset voltage varies according to the combustion state.

A means for preventing reduction of detection accuracy caused by the offset drift of the cylinder inner pressure sensor is to compensate the offset drift according to the processing of data obtained by converting the sensor signal with an A/D conversion method. This means is described in JP-A-2002-242750 and JP-A-2010-196556. Alternatively, the means is to cancel the offset drift by resetting the cylinder inner pressure sensor and/or an amplifier in an electric device at a certain time. This means is described in JP-A-H07-280686 and JP-A-2008-216223.

When the means described in JP-A-2002-242750 and JP-A-2010-196556 is used, the offset drift of the sensor signal output from the cylinder inner pressure sensor is not reduced. Thus, the offset drift of the sensor signal exists. Accordingly, it is necessary to set the gain of the cylinder inner pressure sensor and/or the input circuit to be low in order to always keep the sensor signal within the input range of the A/D converter circuit even when the offset voltage changes. Further, when the means described in JP-A-H07-280686 and JP-A-2008-216223, the offset voltage is reduced just after the sensor and/or the amplifier are reset. However, the offset drift occurs before the sensor and/or the amplifier are reset. Accordingly, it is necessary to set the gain of the cylinder inner pressure sensor and/or the input circuit to be low in order to always keep the sensor signal within the input range of the A/D converter circuit even when the offset voltage changes.

An offset voltage of a low price cylinder inner pressure sensor may change from −0.5 volts to +0.5 volts when the input range is 5 volts. When the gain is set to be low so that the sensor signal is disposed in the input range even if the offset voltage changes in a wide range, the dynamic range of the A/D converter circuit becomes narrow.

SUMMARY

It is an object of the present disclosure to provide a cylinder inner pressure detector for an internal combustion engine. A dynamic range of an A/D converter circuit with respect to a sensor signal of a cylinder inner pressure sensor is wide, and detection accuracy of a cylinder inner pressure is improved.

According to an aspect of the present disclosure, an cylinder inner pressure detector for detecting a cylinder inner pressure of an internal combustion engine by converting a sensor signal from an analog signal to a digital signal, the sensor signal being output from a cylinder inner pressure sensor in accordance with the cylinder inner pressure, the cylinder inner pressure detector includes: a reference voltage output circuit for outputting a reference voltage having a level, which is selected among a plurality of levels according to a switching signal; a level shift circuit for shifting a level of the sensor signal by a selected level of the reference voltage toward a signal potential side corresponding to a low pressure side of the cylinder inner pressure and for outputting a shifted sensor signal; a first A/D converter circuit for receiving the shifted sensor signal from the level shift circuit and for converting the shifted sensor signal from an analog signal to a digital signal; and a controller for outputting the switching signal, which provides the reference voltage to be selected by the reference voltage output circuit in such a manner that the reference voltage has the level disposed on the signal potential side corresponding to the low pressure side from an offset voltage, and for detecting the cylinder inner pressure based on the digital signal output from the first A/D converter. The offset voltage is defined by a voltage of the sensor signal when the cylinder inner pressure is minimum.

In the above detector, since the offset voltage of the cylinder inner pressure sensor during a low pressure period approaches the lower limit voltage of the input range of the first A/D converter circuit even if the offset voltage is varied, the sensor signal corresponding to a high pressure period can be disposed in the input range of the first A/D converter circuit. Thus, an unused range of the input range attributed to the offset drift is reduced, so that an effective variable signal width as a dynamic range of the A/D converter circuit with respect to the sensor signal is widely secured. Accordingly, the gain with respect to the sensor signal can be set higher than a conventional art, so that the resolution of the first A/D converter circuit is improved, and the inner pressure is detected with high accuracy.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

A cylinder inner pressure detector of an internal combustion engine according to a first embodiment will be explained with reference to FIGS. 1 to 4. The detector is suitably used for an engine system. As shown in FIG. 2, an engine 1 as an internal combustion engine is a four stroke engine having four cylinders 2, which are first to fourth cylinders. One combustion cycle includes first to fourth cycles, i.e., an intake stroke, a compression stroke, a power stroke (i.e., a combustion stroke) and an exhaust stroke. The cycle has a 720-degree CA cycle. Each stroke at one cylinder is performed with a deviation of 180-degree CA (crank angle) from an adjacent cylinder. Specifically, one stroke of one cylinder starts with a crank angle different from adjacent cylinder by 180 degrees.

Each cylinder 2 includes a cylinder block and a cylinder head. Each cylinder 2 further includes a piston accommodated therein. Further, the cylinder 2 has a combustion chamber disposed over the piston. A cylinder inner pressure sensor 3 is arranged on the cylinder head of each cylinder 2. In the pressure sensor 3, pressure of a combustion chamber as the cylinder inner pressure is applied to a Piezo-electric device (e.g., Piezo-electric resistor) via a diaphragm. An output voltage of the Piezo-electric device is amplified, and then, the Piezo-electric device outputs a sensor signal. The voltage Vp of the sensor signal increases with the cylinder inner pressure.

An injector 4 for injecting fuel into the combustion chamber is arranged in the cylinder 2. When the injector 4 injects the fuel, the piston is reciprocated. Thus, a crank shaft 5 as an output shaft of the engine rotates. Further, a pulsar 6 having teeth disposed on an outer periphery of a body at predetermined intervals rotates together with the crank shaft 5. A crank angle sensor 7 including an electro-magnetic pick-up unit faces the pulsar 7. Thus, the sensor 7 outputs a crank angle signal having a pulse shape according to the rotation of the crank shaft 5.

The engine ECU 8 includes a micro computer 9. The computer 9 executes a control program stored in a non-volatile memory. Thus, various sensor signals such as the crank angle signal and an acceleration opening degree signal are input unto the ECU 8 so that the ECU 8 obtains information about the driving conditions of the engine 1. According to the information about the driving conditions, the ECU 8 executes a fuel supply control. Further, the ECU 8 calculates a starting timing of injection of the fuel and an injection timing with respect to a fuel injection cylinder so that the ECU 8 executes a fuel injection control. The ECU 8 outputs an injection signal to an EDU (i.e., electronic driving unit) 10 so that the ECU 8 controls an injector 4.

Figure 1:
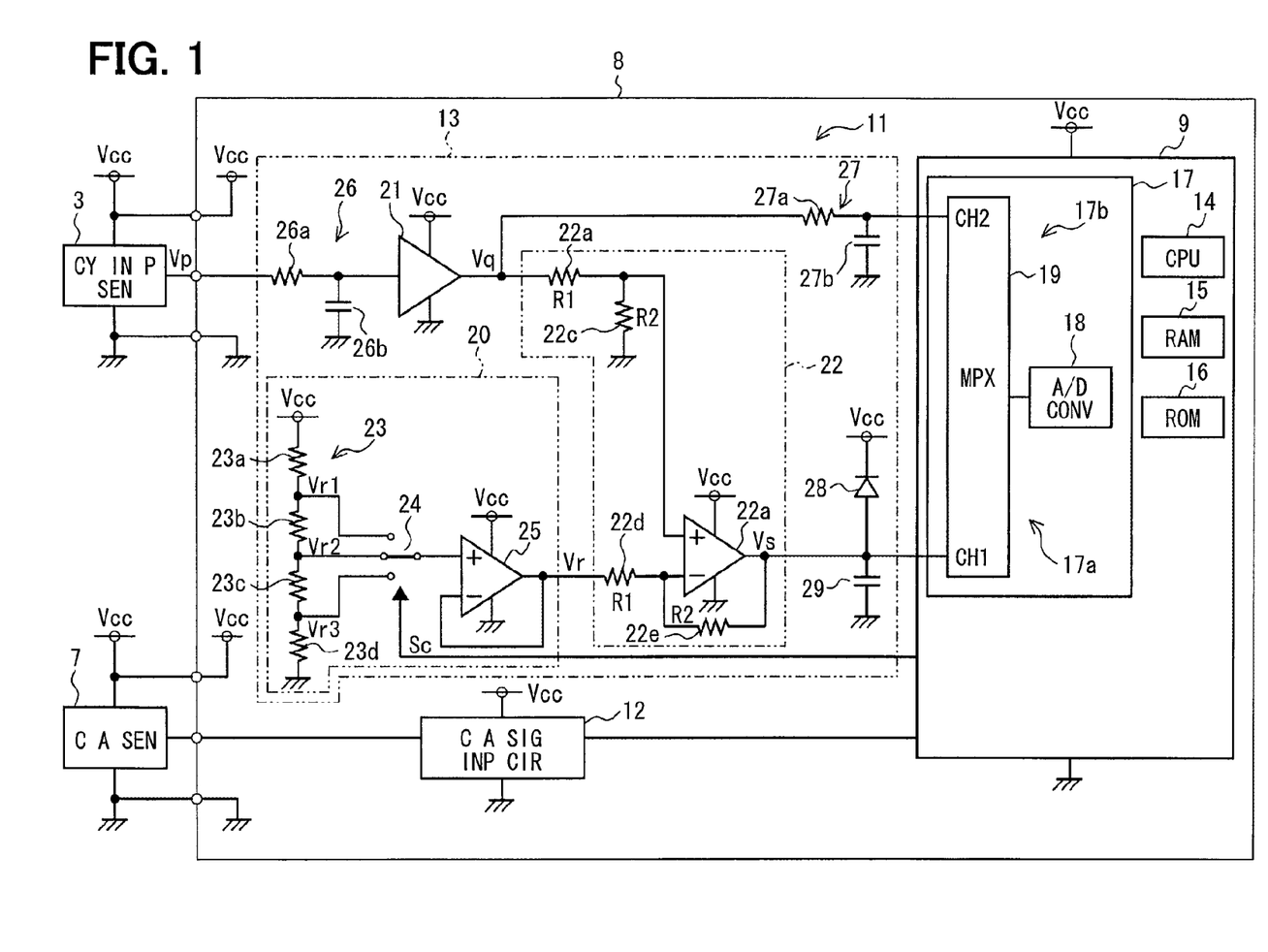
FIG. 1 is a diagram showing a cylinder inner pressure detection circuit according to a first embodiment.
Figure 2:
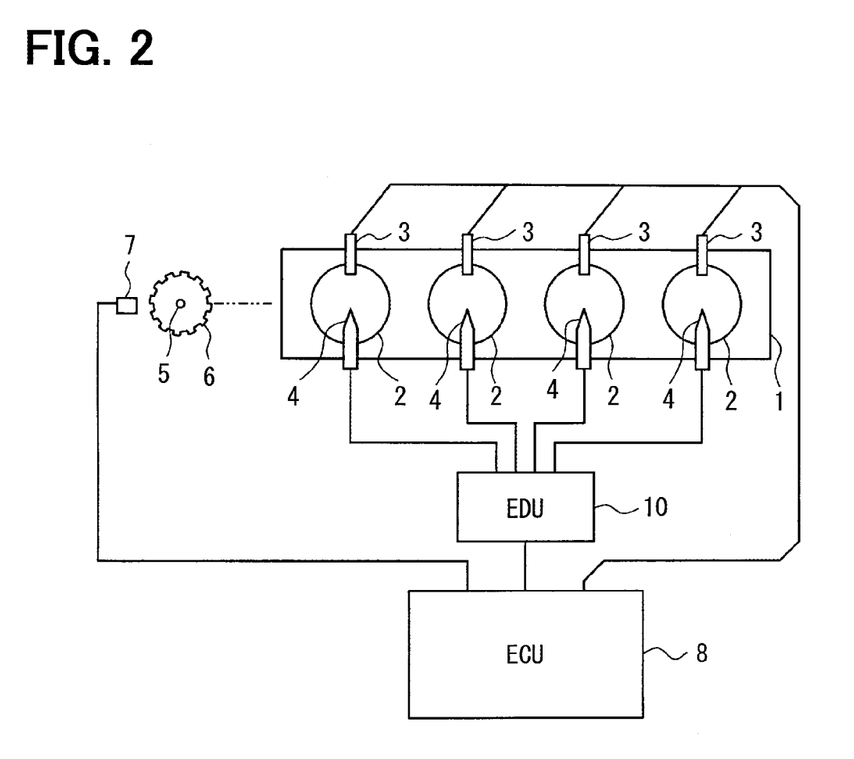
FIG. 2 is a diagram showing an engine system.

FIG. 1 shows a cylinder inner pressure detection circuit 11 in the ECU 8. A cylinder inner pressure detection circuit 11 includes the micro computer 9, a crank angle signal input circuit 12 and a cylinder inner pressure signal input circuit 13. The cylinder inner pressure signal input circuit 13 is arranged at each cylinder inner pressure sensor 3. FIG. 1 shows only one circuit 13. The detection circuit 11, the sensor 3 and the crank angle sensor 7 are energized with a common power source voltage Vcc such as 5 volts so that they function.

The crank angle signal input circuit 12 as a crank angle detection device detects a crank angle and a rotation speed based on the crank angle signal, which is output from a crank angle sensor 7. The micro computer 9 as a controller includes a CPU 14, a RAM 15, a ROM 16, an A/D converter circuit 17 and an input/output port. The ROM 16 as a non volatile memory stores the above described control program, various data used for the fuel supply control and the fuel injection control, and reference voltages Vr1, Vr2 and Vr3.

The A/D converter circuit 17 includes an A/D converter 18 and a multiplexer 19 so that the A/D converter circuit 17 provides multiple channels. The A/D converter 18 has a sample hold circuit. The input circuit 13 at each cylinder uses two channels. Thus, when the engine includes four cylinders, eight channels are used. For example, in case of the first cylinder, the sensor signal output from the inner pressure sensor 3 is converted in an A/D conversion manner with using first and second channels CH1, CH2. Here, the first channel CH1 is provided by a first A/D converter circuit 17a, and the second channel CH2 is provided by a second A/D converter circuit 17b. Other channels are not shown in FIG. 1. The input range of the A/D converter circuit 17 at each channel is from zero volt as a lower limit voltage to 5 volts as an upper limit voltage.

The input circuit 13 includes a reference voltage output circuit 20, a buffer circuit 21, a differential amplifier circuit 22 and the like. The reference voltage output circuit 20 outputs a reference voltage Vr having a certain level, which is selected among three different reference voltages Vr1, Vr2 and Vr3 having different levels based on a switching signal Sc. Each reference voltage Vr1, Vr2 and Vr3 is generated by dividing the power source voltage Vcc with multiple resistors 23a to 23d. The resistors 23a-23d provide a voltage division circuit 23. The selector switch 24 selects one of the reference voltages Vr1, Vr2 and Vr3 in accordance with the switching signal Sc. Selected reference voltage Vr is output via an operational amplifier 25, which provides a voltage follower.

The sensor signal output from the cylinder inner pressure sensor 3 has a frequency component in a range between 10 HZ and 120 Hz. Thus, unwanted components such as a noise of the sensor signal is removed by a low pass filter 26, which includes a resistor 26a and a capacitor 26b. Then, the sensor signal is input into the buffer circuit 21. An output voltage Vq of the buffer circuit 21 is input into the differential amplifier circuit 22 and the second A/D converter circuit 17b.

The gain of the buffer circuit 21 is set such that the voltage Vq is disposed in an input range of the second A/D converter circuit 17b in a whole region of the combustion cycle of the engine 1, i.e., in a whole region of 720 degrees CA. In the present embodiment, since the power source voltage Vcc of the inner pressure sensor 3 is equal to the power source voltage Vcc of the micro computer 9, the gain is set to be one. Accordingly, the sensor signal having the voltage Vp is input into the second A/D converter circuit 17b without amplifying and shifting a level of the sensor signal. An input section of the second A/D converter circuit 17b includes a low pass filter 27, which includes a resistor 27a and a capacitor 27b. The capacitor 27b reduces a sampling error, which is generated by a charge distribution between the capacitor 27b and a capacitor for holding a sample in the A/D converter 18.

The differential amplifier circuit 22 corresponds to a level shift circuit. The circuit 22 includes an operational amplifier 22a and resistors 22b-22e. The resistance of each of the resistors 22b and 22d is defined as a resistance R1, and the resistance of each of the resistors 22c and 22e is defined as a resistance R2. The output voltage Vs of the differential amplifier circuit 22 is obtained by the following equation F1.

$$Vs = R2/R1(Vq - Vr) \quad \text{F1}$$

Specifically, the differential amplifier circuit 22 shifts a level of the sensor signal having the voltage of Vq output from the buffer circuit 21 by the reference voltage Vr in a direction of the signal voltage corresponding to the low pressure side of the inner pressure. Specifically, the circuit 22 reduces the voltage Vq of the sensor signal by the reference voltage Vr. Then, the circuit 22 amplifies (R2/R1) times the reduced voltage Vq, and inputs the amplified voltage Vq to the first A/D converter circuit 17a. Here, a relationship of Vp=Vq is satisfied except for the frequency component cut by the low pass filter 26. The output voltage Vs is also obtained by the following equation F2.

$$Vs = R2/R1(Vp - Vr) \quad \text{F2}$$

The input unit for inputting into the first A/D converter circuit 17a includes a diode 28 and a capacitor 29. The capacitor 29 reduces a sampling error caused by the charge division between the capacitor 29 and a capacitor for holding a sample in the A/D converter 18, similar to the capacitor 27b.

Figure 3:
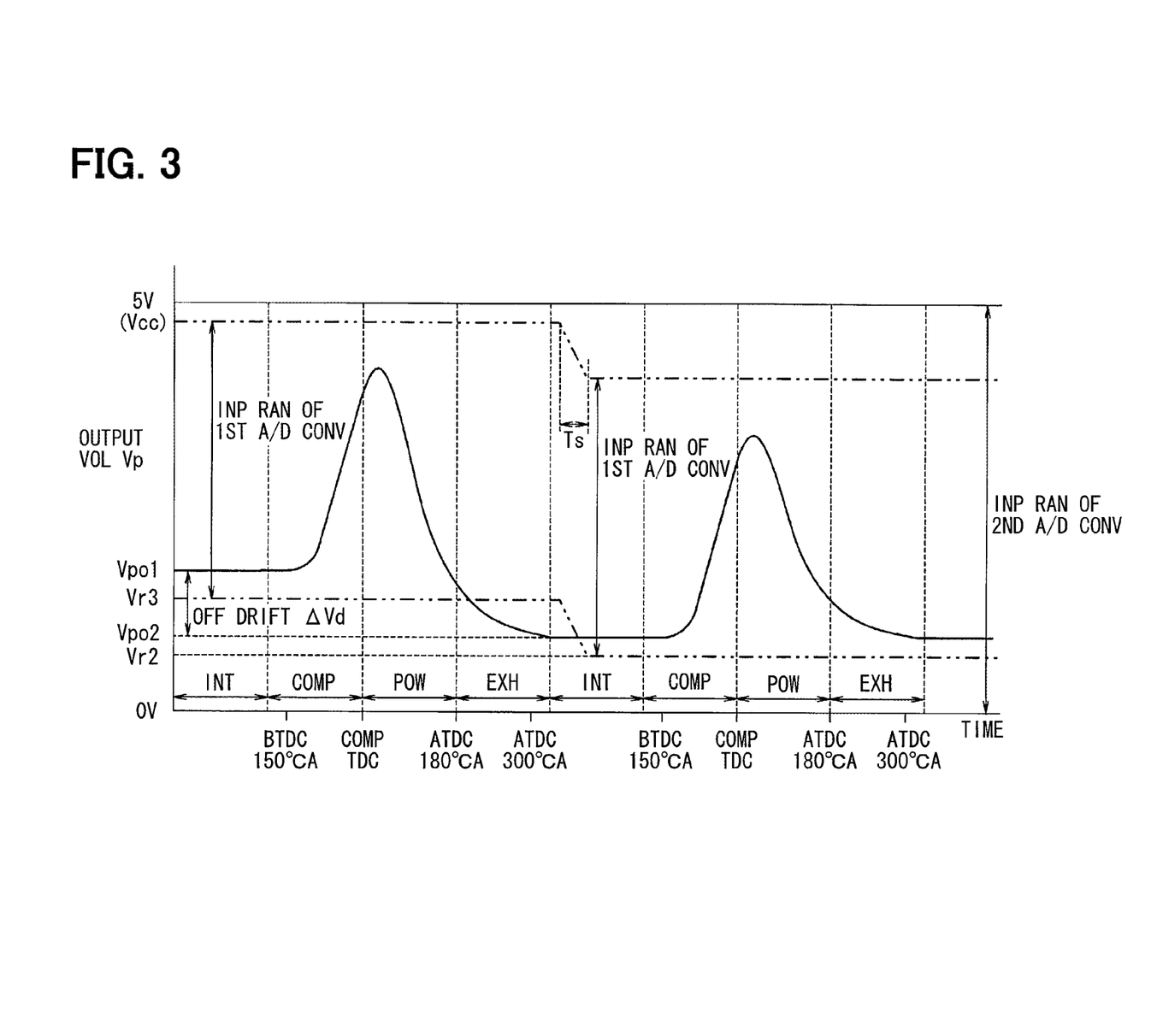
FIG. 3 is a graph showing time variation of a voltage of a sensor signal.

Next, with reference to FIGS. 3 and 4, a function of the present embodiment will be explained. FIG. 3 shows time variation of the voltage Vp of the sensor signal in two combustion cycles. In general, the cylinder inner pressure rapidly increases at the compression stroke. Then, after a compression top dead center (compression TDC), the inner pressure represents the maximum value in the power stroke. Then, the inner pressure rapidly reduces when the cycle proceeds from the power stroke to the exhaust stroke. The inner pressure reaches the minimum value when the cycle proceeds from the exhaust stroke to the intake stroke. The voltage Vp of the sensor signal also varies in accordance with the inner pressure. However, the offset voltage Vpo may change (i.e., drift) according to the temperature change and/or the pressure change.

The offset voltage Vpo is the voltage Vp of the sensor signal while the inner pressure reduces to the minimum value. Specifically, the offset voltage Vpo is the voltage Vp of the sensor signal in a period from the ATDC of 300 degrees CA in one cycle to the BTDC of 150 degrees CA in a next cycle, the period in which the inner pressure is minimum. Between the one cycle and the next cycle in FIG. 3, the offset voltage Vpo drifts by ΔVd as an offset drift. Specifically, the offset voltage Vpo in the next cycle is different by ΔVd from the one cycle.

As described above, the voltage Vp of the sensor signal in a whole of the combustion cycle is disposed within an input range of the second A/D converter circuit 17b between 0 volt and 5 volts. On the other hand, in order to increase the resolution of the A/D converter circuit 17a, the gain of the differential amplifier circuit 22 shown in equations F1 and F2 is set to be larger than one. As a result, the maximum variation width of the voltage Vs of the sensor signal other than the drift, which is amplified in each combustion cycle, is substantially equal to the input range width (e.g., 5 volts) of the first A/D converter circuit 17a although the maximum variation width may be slightly different from the input range width by a little allowance width. Here, in FIG. 3, the sensor signal is defined as the voltage Vp, which is a value before amplifying. Further, in FIG. 3, the input range of the first A/D converter circuit 17a relatively narrowed with respect to the sensor signal because of the amplification effect of the differential amplifier circuit 22 is shown as a chain double-dashed line.

Under a relationship of amplitude, it is necessary to detect the offset voltage Vpo every combustion cycle and to shift the level of the voltage Vp according to the offset voltage Vpo so that the voltage Vs of the amplifier sensor signal is disposed within the input range of the first A/D converter circuit 17a. In FIG. 3, since the offset voltage of the one combustion cycle is defined as Vpo1, the level shift is performed with using the reference voltage Vr3, which is the nearest value of the offset voltage Vpo1 and has the level on the signal potential side (i.e., zero volt side) corresponding to the low pressure side of the inner pressure from the offset voltage Vpo1. Further, since the offset voltage of the next cycle is defined as Vpo2, the level shift is performed with using the reference voltage Vr2, which is the nearest value of the offset voltage Vpo2 and has the level on the signal potential side (i.e., zero volt side) corresponding to the low pressure side of the inner pressure from the offset voltage Vpo2.

Figure 4:
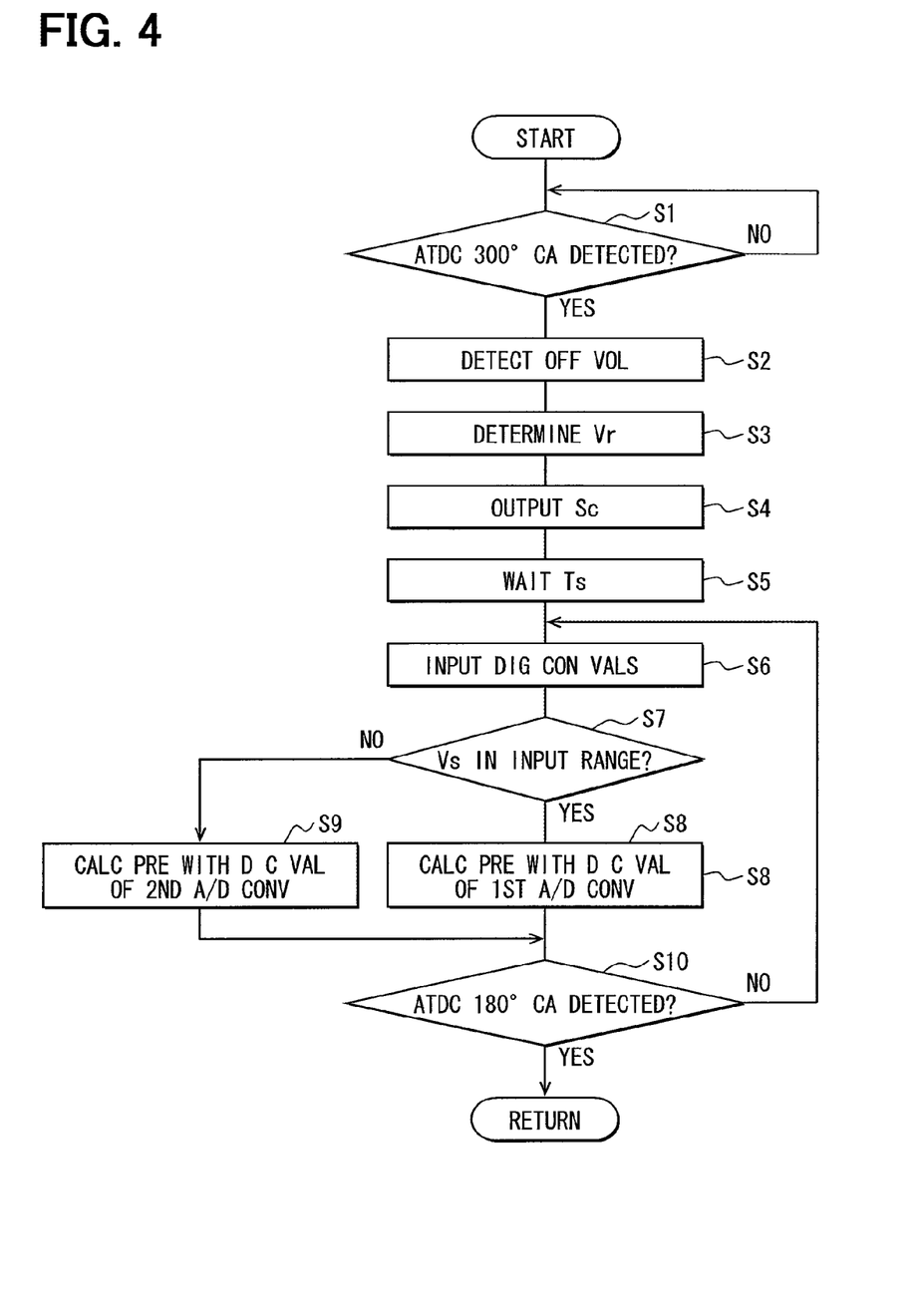
FIG. 4 is a flowchart showing a cylinder inner pressure detection process.

FIG. 4 shows a flowchart of the inner pressure detection process, which is executed repeatedly by the micro computer 9. The A/D converter circuit 17 executes the A/D conversion with switching the multiplexer 19 so that the A/D conversion in each channel including the first A/D converter circuit 17a and the second A/D converter circuit 17b is sequentially executed. The digital conversion value output from each channel of the A/D converter circuit 17 is stored in the RAM 15.

The micro computer 9 detects the offset voltage Vpo in a period between the ATDC of 300 degrees CA in one cycle and the BTDC of 150 degrees CA in the next cycle. Here, in step S1, it is determined whether the ATDC of 300 degrees CA is detected. Specifically, in step S1, until the ATDC of 300 degrees CA as the detection point is detected, the process is in a standby mode.

When it is determined that the ATDC of 300 degrees CA is detected, i.e., when the determination of step S1 is "YES," in step S2, the offset voltage Vpo is detected in step S2 according to the digital conversion value output from the second A/D converter circuit 17b. As described above, in step S3, the micro computer 9 selects one of Vr1 to Vr3 as the reference voltage Vr, which is the nearest value of the offset voltage Vpo on the signal potential side corresponding to the low pressure side of the inner pressure from the offset voltage Vpo. Then, in step S4, the switching signal Sc for switching to the reference voltage Vr with using the reference voltage output circuit 20.

Here, after the switching signal Sc is output, it is necessary to take time to stabilize the operation of switching the reference voltage Vr with using the reference voltage output circuit 20 and the level shift operation and the amplification operation of the differential amplifier circuit 22 after the new reference voltage Vr is input as the switched reference voltage yr. Thus, in step S4, the micro computer 9 outputs the switching signal Sc at a certain crank angle. The certain crank angle is prior to the crank angle, at which the detection of the inner pressure is actually necessitated, by at least an angle corresponding to a stabilization time Ts. Here, the crank angle, at which the detection of the inner pressure is actually necessitated, is for example, the BTDC 150 degrees CA. Then, in step S5, the process waits for passing at least the stabilization time Ts.

Accordingly, the micro computer 9 does not utilize the digital conversion value output from the first A/D converter circuit 17a until the predetermined stabilization time Ts has elapsed since the switching signal Sc is output. Thus, it is restricted from erroneous detection of the inner pressure with using the digital conversion value before the operation is stabilized after the reference voltage Vr is switched.

Then, in step S6, the micro computer 9 inputs the digital conversion value from the first A/D converter circuit 17a and the second A/D converter circuit 17b. Since the reference voltage Vr is appropriately selected in step S3, the voltage Vs of the sensor signal to be output from the differential amplifier circuit 22 should be disposed within the input range of the first A/D converter circuit 17a. Although normally the inner pressure sensor 3 outputs the voltage Vp in a range between 1 volt and 4 volts, the sensor 3 may output the voltage Vp out of the range. Further, the voltage Vs may exceed the input range of the first A/D converter circuit 17a when the rapid offset drift occurs, or when the step width among the reference voltages Vr1 to Vr3 is very large.

Thus, in step S7, the micro computer 9 executes calculation with reference to the digital conversion value output from the second A/D conversion circuit 17b and the reference voltage Vr selected according to the switching signal Sc. Further, the microcomputer 9 determines whether the voltage Vs is disposed in the input range of the first A/D converter circuit 17a in step S7. Here, when the micro computer 9 determines that the voltage Vs is disposed in the input range, i.e., when the determination of step S7 is "YES," it goes to step S8. In step S8, the micro computer 9 calculates the inner pressure based on the digital conversion value having the high resolution output from the first A/D converter circuit 17a. On the other hand, when the micro computer 9 determines that the voltage Vs is not disposed in the input range, i.e., when the determination of step S7 is "NO," it goes to step S9. In step S9, the micro computer 9 calculates the inner pressure based on the digital conversion value output from the second A/D converter circuit 17b. Here, if there is no possibility for the voltage Vs to be out of the input range of the first A/D converter circuit 17a, steps S7 and S9 may be skipped.

Then, in step S10, the micro computer 9 determines whether the timing, at which the detection value of the inner pressure is needed, has come. Here, the timing, at which the detection value of the inner pressure is needed, may be the ATDC 180 degrees CA, for example. In this case, the computer 9 determines whether the cycle passes through the ATDC 180 degrees CA. Until the cycle passes through the ATDC 180 degrees CA, the computer repeats steps S6 to S9. After the cycle passes through the ATDC 180 degrees CA, it returns to step S1. Then, in order to detect the inner pressure of the next combustion cycle, the computer starts to execute the detection process for detecting the offset voltage Vpo.

In the present embodiment, the micro computer 9 detects the offset voltage Vpo of the sensor signal while the inner pressure is reduced. The computer 9 shifts the level of the sensor signal toward the low pressure side by the reference voltage Vr corresponding to the offset voltage Vpo. Thus, without depending on the offset drift, the higher inner pressure can be detected according to the digital conversion value output from the first A/D converter circuit 17a. Further, the dynamic range of the first A/D converter circuit 17a with respect to the sensor signal can be enlarged. As a result, the gain with respect to the sensor signal can be set higher, compared with a conventional detector. Thus, the resolution of the first A/D converter circuit 17a is improved, so that the inner pressure is detected with high accuracy. The effects are obtained in a case where the offset drift occurs at the inner pressure sensor 3 and in a case where the gain of the sensor 3 as a sensing sensitivity factor is changed.

In the above cases, the computer selects the reference voltage Vr, which is the nearest value of the offset voltage Vpo on the signal potential side corresponding to the low pressure side of the inner pressure from the offset voltage Vpo, and then, executes the level shift operation. Thus, the dynamic range can be broadened with using one of the reference voltages Vr1 to Vr3, which are capable of being output from the reference voltage output circuit 20. Thus, the cylinder inner pressure is detected with high accuracy.

The differential amplifier circuit 22 executes both of the level shift operation and the amplification operation at the same time. Thus, the number of elements of the detector is reduced, and further, the manufacturing cost of the detector is reduced. The gain is set such that the maximum variation width of the output voltage Vs of the differential amplifier circuit 22 approaches the input range width of the first A/D converter circuit 17a. Accordingly, very high resolution is obtained.

The cylinder inner pressure detection circuit 11 includes the second A/D converter circuit 17b for setting the voltage Vp of the sensor signal in a whole of the combustion cycle within the input range. The micro computer 9 detects the offset voltage Vpo with using the digital conversion value output from the second A/D converter circuit 17b. Thus, even if the sensor signal drifts (i.e., varies), the computer 9 always detects the offset voltage Vpo. Further, if the voltage Vs of the amplified sensor signal is disposed out of the input range of the first A/D converter circuit 17a, the computer detects the inner pressure based on the digital conversion value output from the second A/D converter circuit 17b. Thus, even if the offset drift of the sensor signal rapidly changes, the inner pressure is accurately detected.

The inner pressure detection circuit 11 includes a crank angle signal input circuit 12 for detecting the crank angle based on the crank angle signal. The computer 9 determines the period, in which the inner pressure is minimum, based on the detected crank angle. Thus, the computer 9 can detect the offset voltage Vpo accurately.

The micro computer 9 outputs the switching signal Sc of the reference voltage Vr at the certain crank angle. The certain crank angle is prior to the crank angle, at which it is necessary to detect the inner pressure, by at least an angle corresponding to the stabilization time Ts of the reference voltage output circuit 20 and the differential amplifier circuit 22. Thus, at the crank angle, at which it is necessary to detect the inner pressure, the inner pressure is detected with high accuracy under a condition that the operation of both of the reference voltage output circuit 20 and the differential amplifier circuit 22 is stable.

The inner pressure detection circuit 11 includes the differential amplifier circuit 22 and the reference voltage output circuit 20 in each cylinder 2. Thus, characteristic variations of the cylinder inner pressure sensors 3 of the cylinders 2 are individually adjusted. Further, since each cylinder 2 includes the reference voltage output circuit 20, the influence of the noise caused at a time when the reference voltage Vr is switched is improved (i.e., reduced).

Second Embodiment

Figure 5:
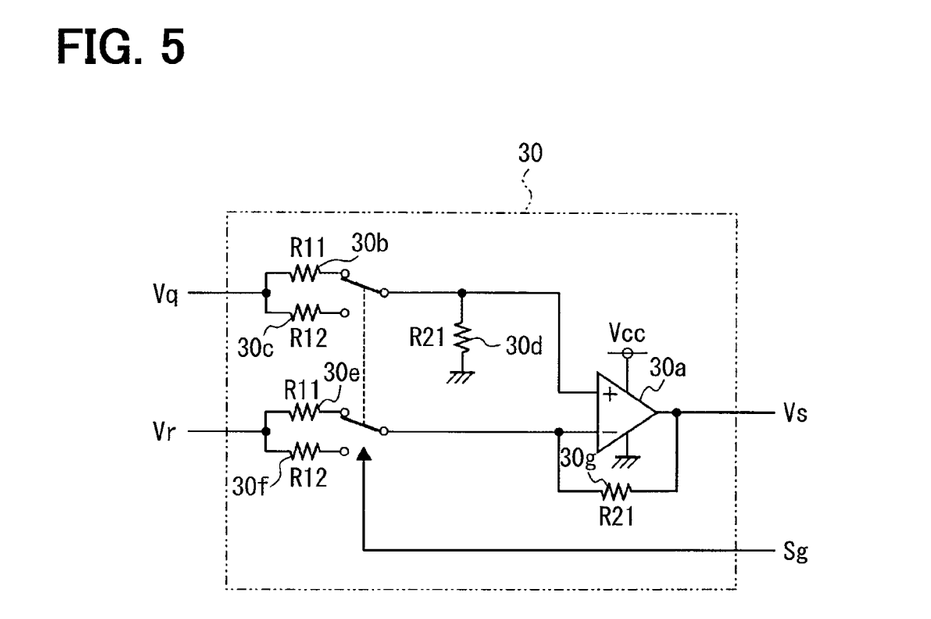
FIG. 5 is a circuit diagram showing a differential amplifier circuit according to a second embodiment.

FIG. 5 shows the differential amplifier circuit 30 in the cylinder inner pressure detection circuit 11. The differential amplifier circuit 30 corresponding to the level shift circuit includes an operational amplifier 30a, resistors 30b-30g and selector switches 30h, 30i. The selector switch 30h switches between the resistor 30b and the resistor 30h. The selector switch 30i switches between the resistor 30e and the resistor 30f. The switch 30h in association with the switch 30i executes the switching operation according to the gain switching signal Sg.

The resistance of each of the resistors 30b, 30e is defined as R11, the resistance of each of the resistors 30c, 30f is defined as R12, and the resistance of each of the resistors 30d, 30g is defined as R21. The output voltage Vs of the differential amplifier circuit 30 satisfies the following equations F3 and F4.

$$Vs = R21/R11(Vq - Vr) \qquad \text{F3}$$

$$Vs = R21/R12(Vq - Vr) \qquad \text{F4}$$

The computer 9 detects the combustion conditions based on the sensor signals output from various sensors including the inner pressure sensor 3. The computer 9 operates the selector switches 30h, 30i in such a manner that the maximum variation width of the voltage Vs under the combustion conditions is equal to or smaller than the input range width of the second A/D converter circuit 17b and the maximum variation width approaches the input range width. In the present embodiment, the appropriately dynamic range with respect to the sensor signal is secured, and further, the resolution is improved.

Other Embodiments

In the present embodiment, the micro computer 9 sets the input range in a range between 0 volt and 5 volts when the computer 9 executes the determination process in step S7 for determining whether the voltage Vs is disposed in the input range of the first A/D converter circuit 17a. Alternatively, the computer 9 may set the input range in a narrower range. For example, the upper limit of 5 volts of the input range of the first A/D converter circuit 17a may be reduced, to an upper threshold voltage such as 4.5 volts. Further, the lower limit of 0 volt of the input range of the first A/D converter circuit 17a may be increased to a lower threshold voltage such as 0.5 volt. In this case, the computer 9 determines whether the voltage Vs of the amplified sensor signal is disposed in the input range between the upper threshold voltage and the lower threshold voltage.

The A/D conversion error near the upper limit voltage of the input range (e.g., in a range between 4.5 volts and 5.0 volts) may be larger than the error in a middle of the input range. Further, the A/D conversion error near the lower limit voltage of the input range (e.g., in a range between 0 volt and 0.5 volts) may be larger than the error in a middle of the input range. When the above feature is utilized, the A/D conversion error is reduced, so that the inner pressure is detected with high accuracy.

In the above embodiments, in step S5, the computer 9 waits for the predetermined stabilization time Ts after the switching signal Sc is output so that the operation of the switching of the reference voltage Vr is stabilized. Alternatively, or in addition to this feature, after the switching signal Sc is output, the computer 9 may determine that the operation of the switching of the reference voltage Vr is completed when the difference between the inner pressure detected by the digital conversion value output from the first A/D converter circuit 17a and the inner pressure detected by the digital conversion value output from the second A/D converter circuit 17b is equal to or smaller than a predetermined threshold value for the switching completion determination. In a case where the above feature is added to the waiting operation of the stabilization time Ts, the computer 9 may determine that the operation of the switching of the reference voltage Vr is completed after the earlier of: or the later of: the time when the stabilization time Ts has elapsed; or the time when the difference of the inner pressure is equal to or smaller than the predetermined threshold value. Thus, waste of time is minimized. Further, the computer 9 does not detect the inner pressure before the operation of the switching of the reference voltage Vr is completed, i.e., before the operation is stabilized.

In the above embodiments, the first and second A/D converter circuits 17a, 17b execute the A/D conversion concurrently. Thus, the micro computer 9 may determine at any time in the combustion cycle whether an erroneous situation occurs when the difference between the inner pressure detected according to the digital conversion value output from the first A/D conversion circuit 17a and the inner pressure detected according to the digital conversion value output from the second A/D conversion circuit 17b is equal to or larger than an error determination threshold. Thus, the computer 9 detects the error occurring at least one of the first and second A/D converter circuits 17a, 17b. The reliability of the inner pressure detection circuit 11 is improved.

In the above embodiments, the offset voltage Vpo is detected according to the digital conversion value output from the second A/D converter circuit 17b. Alternatively, the offset voltage Vpo may be detected according to the digital conversion value output from the first A/D converter circuit 17a. In this case, even if the offset drift occurs, the gain may be set such that the voltage Vs of the sensor signal is disposed in the input range of the first A/D converter circuit 17a. Alternatively, when the voltage Vs is not disposed in the input range of the first A/D converter circuit 17a, the offset voltage Vpo may be detected after the reference voltage Vr is changed so that the voltage Vs is disposed in the input range of the first A/D converter circuit 17a. In this case, it is not necessary to equip the second A/D converter circuit 17b in the detector.

The second A/D converter circuit 17b may execute the A/D conversion after the detector shifts the level of the sensor signal by a predetermined reference voltage.

Alternatively, a buffer circuit 21 may be arranged in the first and second A/D converter circuits 17a, 17b, individually so that the gain of each buffer circuit 21 is set.

The A/D converter circuit 17 may include an A/D converter 18 at each channel instead the A/D converter circuit 17 includes the multiplexer 19.

The level shift circuit may be a circuit other than the differential amplifier circuit 22. As long as the level shift circuit performs the level shift function, the level shift circuit may be any circuit. In this case, the amplification function may be performed by other amplifier circuits such as the buffer circuit 21.

The reference voltage output circuit 20 can output three reference voltages Vr1 to Vr3. Alternatively, the circuit 20 may output two, four or more reference voltages. Alternatively, the circuit 20 may output the reference voltage Vr, which is continuously variable (i.e., an analog value), and therefore, not the discrete voltage.

As long as the reference voltage Vr to be selected by the reference voltage output circuit 20 has the level on the signal potential side corresponding to the low pressure side of the inner pressure from the offset voltage Vpo, the reference voltage Vr may be any voltage. Thus, it is not necessary to select the reference voltage Vr, which is the nearest voltage of the offset voltage Vpo.

The inner pressure detection circuit 11 includes the reference voltage detection circuit 20 at each cylinder 2. Alternatively, a common reference voltage output circuit 20 may be arranged for multiple cylinders 2.

The above disclosure has the following aspects.

According to an aspect of the present disclosure, an cylinder inner pressure detector for detecting a cylinder inner pressure of an internal combustion engine by converting a sensor signal from an analog signal to a digital signal, the sensor signal being output from a cylinder inner pressure sensor in accordance with the cylinder inner pressure, the cylinder inner pressure detector includes: a reference voltage output circuit for outputting a reference voltage having a level, which is selected among a plurality of levels according to a switching signal; a level shift circuit for shifting a level of the sensor signal by a selected level of the reference voltage toward a signal potential side corresponding to a low pressure side of the cylinder inner pressure and for outputting a shifted sensor signal; a first A/D converter circuit for receiving the shifted sensor signal from the level shift circuit and for converting the shifted sensor signal from an analog signal to a digital signal; and a controller for outputting the switching signal, which provides the reference voltage to be selected by the reference voltage output circuit in such a manner that the reference voltage has the level disposed on the signal potential side corresponding to the low pressure side from an offset voltage, and for detecting the cylinder inner pressure based on the digital signal output from the first A/D converter. The offset voltage is defined by a voltage of the sensor signal when the cylinder inner pressure is minimum.

In the above detector, since the offset voltage of the cylinder inner pressure sensor during a low pressure period approaches the lower limit voltage of the input range of the first A/D converter circuit even if the offset voltage is varied, the sensor signal corresponding to a high pressure period can be disposed in the input range of the first A/D converter circuit. Thus, an unused range of the input range attributed to the offset drift is reduced, so that an effective variable signal width as a dynamic range of the A/D converter circuit with respect to the sensor signal is widely secured. Accordingly, the gain with respect to the sensor signal can be set higher than a conventional art, so that the resolution of the first A/D converter circuit is improved, and the inner pressure is detected with high accuracy.

Alternatively, the cylinder inner pressure detector may further include: a second A/D converter circuit for receiving the sensor signal from the cylinder inner pressure sensor and for converting the sensor signal from an analog signal to a digital signal. The controller detects the offset voltage based on the digital signal output from the second A/D converter circuit when the cylinder inner pressure is minimum. The second A/D converter circuit executes the A/D conversion with shifting the level according to a constant reference voltage or without shifting the level of the sensor signal even if the offset of the sensor signal is varied. Thus, even if the offset of the sensor signal is largely varied, the offset voltage in a predetermined dynamic range is detected. Thus, the reference voltage output circuit can select the reference voltage surely.

Alternatively, a gain of the sensor signal to be input into the second A/D converter circuit may be set in such a manner that the voltage of the sensor signal is disposed in an input range of the second A/D converter circuit. Thus, even if the cylinder inner pressure is varied, or even if the offset of the sensor signal is drifted, the second A/D converter circuit can detect the inner pressure including the offset voltage without changing the gain of the sensor signal. Further, if the sensor signal exceeds the input range of the first A/D converter circuit when the offset voltage is drifted, the inner pressure is detected accurately by the second A/D converter circuit instead of the first A/D converter circuit.

Alternatively, the cylinder inner pressure detector may further include: a crank angle detector for detecting a crank angle based on a crank angle signal, which is output from a crank angle sensor. The crank angle sensor is disposed in the internal combustion engine, and the controller detects the offset voltage based on the digital signal output from the second A/D converter circuit when the crank angle is separated from a compression top dead center by a predetermined angle or more. In this case, the inner pressure represents the maximum value in the power stroke around the compression top dead center. Then, the inner pressure reduces when the cycle proceeds from the power stroke to the exhaust stroke. The inner pressure increases again when the cycle proceeds from the intake stroke to the compression stroke. Thus, the inner pressure reaches the minimum value when the crank angle is separated from a compression top dead center by a predetermined angle or more. For example, the inner pressure reaches the minimum value in a crank angle range between the exhaust stroke and the intake stroke. Thus, the offset voltage, as the voltage of the sensor signal when the inner pressure is minimum, is accurately detected.

Further, the detection of the cylinder inner pressure is necessitated at a certain crank angle, and the controller outputs the switching signal at a crank angle, which is prior to the certain crank angle by at least an angle corresponding to a stabilization time of the reference voltage. In this case, the inner pressure is detected with high accuracy with using the stable reference voltage during the certain crank angle range at which the detection of the cylinder inner pressure is necessitated. Alternatively, the switching signal may be output at a certain crank angle, which corresponds to the stabilization time of the level shift circuit in addition to the stabilization time of the reference voltage.

Alternatively, the controller may utilize the digital signal from the first A/D converter circuit after a predetermined stabilization time has elapsed since the switching signal is output. In this case, detection of the inner pressure with using the digital signal before the switching operation of the reference voltage is stabilized is prevented. Here, the detection of the cylinder inner pressure is necessitated includes a reference voltage output operation executed by the reference voltage output circuit and an operation of the level shift circuit based on a new reference voltage. Further, the determination error of the erroneous situation is prevented since the digital signal before the switching operation of the reference voltage is stabilized is used.

Alternatively, the level shift circuit may include a differential amplifier circuit, which shifts the level of the sensor signal by the reference voltage, and amplifies the shifted sensor signal with a predetermined gain. Thus, the differential amplifier circuit can shift the level of the sensor signal and set the gain, and therefore, the number of elements in the detector is reduced, and the manufacturing cost of the detector is also reduced. Further, since the A/D conversion is performed after the sensor signal is amplified by the differential amplifier circuit, the dynamic range of the sensor signal is appropriately secured even if the variation width of the inner pressure is small, so that the amplitude of the sensor signal is small. Accordingly, the resolution of the detector is improved.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An cylinder inner pressure detector for detecting a cylinder inner pressure of an internal combustion engine by converting a sensor signal from an analog signal to a digital signal, the sensor signal being output from a cylinder inner pressure sensor in accordance with the cylinder inner pressure, the cylinder inner pressure detector comprising:
a reference voltage output circuit for outputting a reference voltage having a level, which is selected among a plurality of levels according to a switching signal;

a level shift circuit for shifting a level of the sensor signal by a selected level of the reference voltage toward a signal potential side corresponding to a low pressure side of the cylinder inner pressure and for outputting a shifted sensor signal;

a first A/D converter circuit for receiving the shifted sensor signal from the level shift circuit and for converting the shifted sensor signal from an analog signal to a digital signal; and a controller for outputting the switching signal, which provides the reference voltage to be selected by the reference voltage output circuit in such a manner that the reference voltage has the level disposed on the signal potential side corresponding to the low pressure side from an offset voltage, and for detecting the cylinder inner pressure based on the digital signal output from the first A/D converter, wherein the offset voltage is defined by a voltage of the sensor signal when the cylinder inner pressure is minimum.

2. The cylinder inner pressure detector according to claim 1, wherein the controller outputs the switching signal, which provides the reference voltage having the level being a nearest of the offset voltage.

3. The cylinder inner pressure detector according to claim 1, further comprising:

a second A/D converter circuit for receiving the sensor signal from the cylinder inner pressure sensor and for converting the sensor signal from an analog signal to a digital signal, wherein the controller detects the offset voltage based on the digital signal output from the second A/D converter circuit when the cylinder inner pressure is minimum.

4. The cylinder inner pressure detector according to claim 3, wherein a gain of the sensor signal to be input into the second A/D converter circuit is set in such a manner that the voltage of the sensor signal is disposed in an input range of the second A/D converter circuit.

5. The cylinder inner pressure detector according to claim 3, wherein the controller determines based on the digital signal from the second A/D converter circuit and the reference voltage output from the reference voltage output circuit whether the shifted sensor signal is disposed in an input range of the first A/D converter circuit, and wherein the detects the cylinder inner pressure based on the digital signal from the second A/D converter circuit instead of the digital signal output from the first A/D converter when the controller determines that the shifted sensor signal is not disposed in the input range of the first A/D converter circuit.

6. The cylinder inner pressure detector according to claim 5, wherein the controller sets an upper threshold voltage and a lower threshold voltage when the controller determines whether the shifted sensor signal is disposed in the input range of the first A/D converter circuit, wherein the upper threshold voltage is smaller than an upper limit voltage of the input range of the first A/D converter circuit, wherein the lower threshold voltage is larger than a lower limit voltage of the input range of the first A/D converter circuit, and wherein the controller determines whether the shifted sensor signal is disposed between the lower threshold voltage and the upper threshold voltage in input range of the first A/D converter circuit.

7. The cylinder inner pressure detector according to claim 3, further comprising:

a crank angle detector for detecting a crank angle based on a crank angle signal, which is output from a crank angle sensor wherein the crank angle sensor is disposed in the internal combustion engine, and wherein the controller detects the offset voltage based on the digital signal output from the second A/D converter circuit when the crank angle is separated from a compression top dead center by a predetermined angle or more.

8. The cylinder inner pressure detector according to claim 7, wherein detection of the cylinder inner pressure is necessitated at a certain crank angle, and wherein the controller outputs the switching signal at a crank angle, which is prior to the certain crank angle by at least an angle corresponding to a stabilization time of the reference voltage.

9. The cylinder inner pressure detector according to claim 8, wherein the controller determines that a switching operation of the reference voltage is completed when a difference between the cylinder inner pressure detected according to the digital signal from the first A/D converter circuit and the cylinder inner pressure detected according to the digital signal from the second A/D converter circuit is equal to or smaller than a predetermined switching operation completion threshold.

10. The cylinder inner pressure detector according to claim 3, wherein the controller operates the first and second A/D converter circuits in parallel, and wherein the controller determines that an detection error occurs when a difference between the cylinder inner pressure detected according to the digital signal from the first A/D converter circuit and the cylinder inner pressure detected according to the digital signal from the second A/D converter circuit is equal to or larger than an error determination threshold.

11. The cylinder inner pressure detector according to claim 1, wherein the controller utilizes the digital signal from the first A/D converter circuit after a predetermined stabilization time has elapsed since the switching signal is output.

12. The cylinder inner pressure detector according to claim 1, wherein the level shift circuit includes a differential amplifier circuit, which shifts the level of the sensor signal by the reference voltage, and amplifies the shifted sensor signal with a predetermined gain.

13. The cylinder inner pressure detector according to claim 1, wherein the level shift circuit adjust a gain thereof according to a gain switching signal.

14. The cylinder inner pressure detector according to claim 1, wherein the internal combustion engine includes a plurality of cylinders, wherein the cylinder inner sensor is arranged at each cylinder, and wherein the reference voltage output circuit and the level shift circuit are arranged at each cylinder.

15. The cylinder inner pressure detector according to claim 1,
wherein the level shift circuit shifts the level of the sensor signal by the selected level of the reference voltage toward the signal potential side so that a voltage of the sensor signal is reduced by the reference voltage.

16. The cylinder inner pressure detector according to claim 15,
wherein the reference voltage has the level disposed on the signal potential side corresponding to the low pressure side from the offset voltage so that the reference voltage is a nearest of the offset voltage on the signal potential side.

17. The cylinder inner pressure detector according to claim 16,
wherein the signal potential side is a zero volt side.

* * * * *